Nov. 14, 1944. W. H. DE LANCEY 2,362,541
FLUID METER
Filed Aug. 11, 1942 3 Sheets-Sheet 1

INVENTOR
WARREN H. DE LANCEY
BY
Chapin & Neal
ATTORNEYS

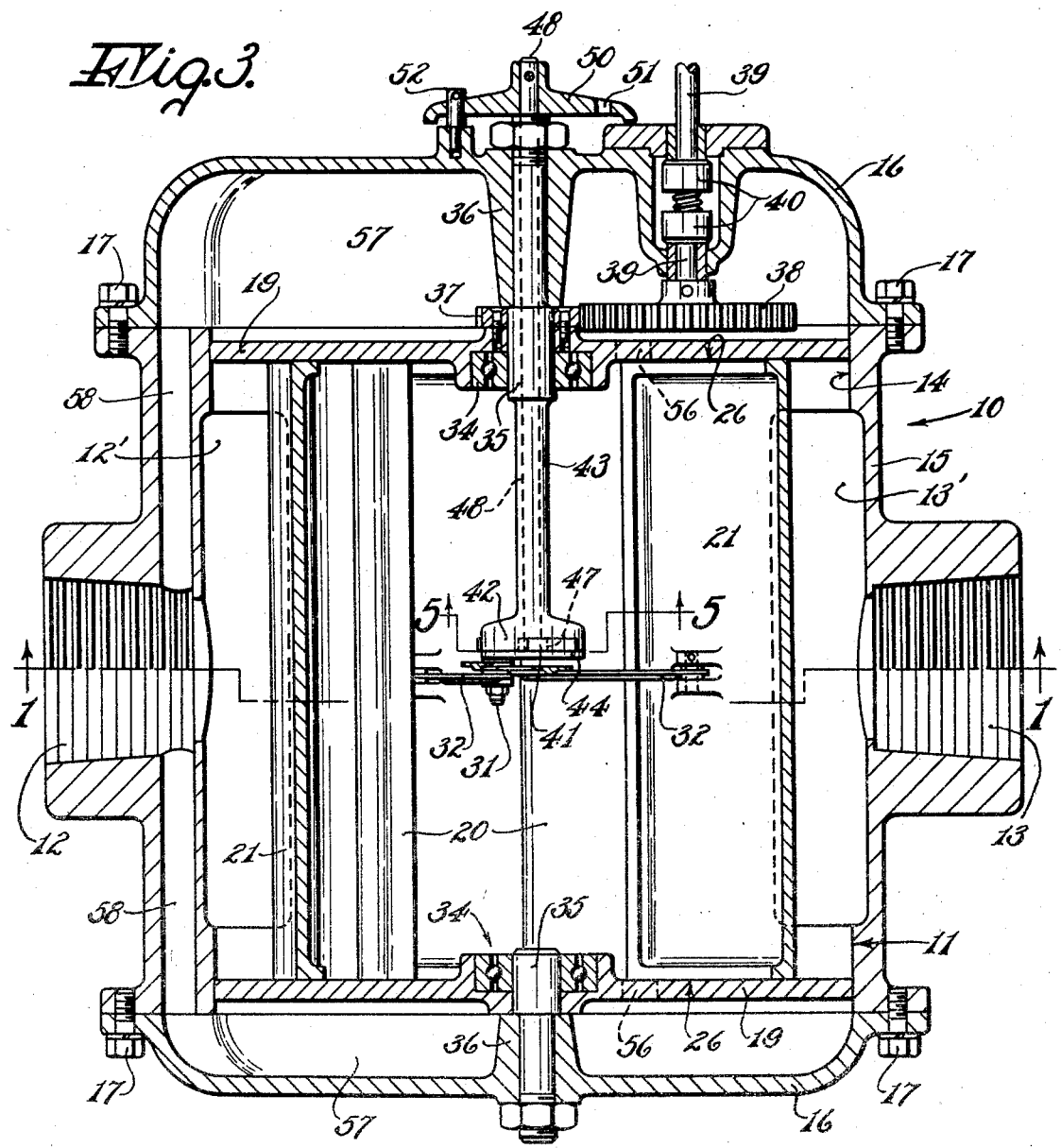

Nov. 14, 1944.    W. H. DE LANCEY    2,362,541
FLUID METER
Filed Aug. 11, 1942    3 Sheets-Sheet 3
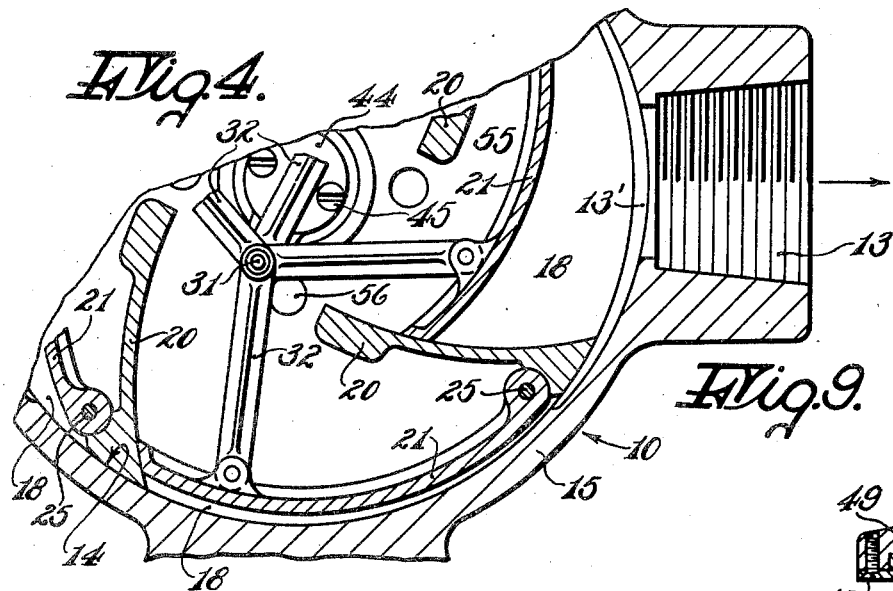
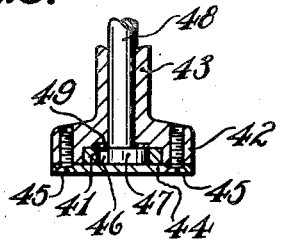
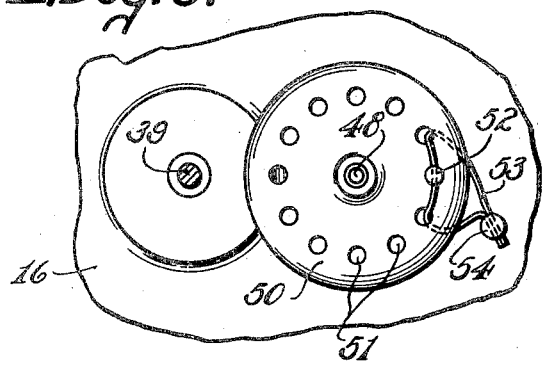
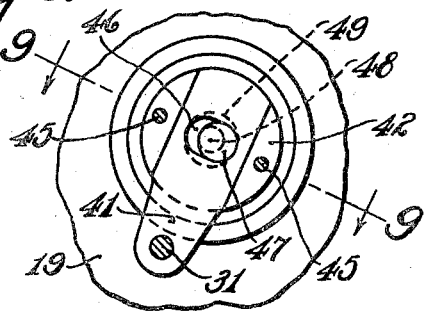
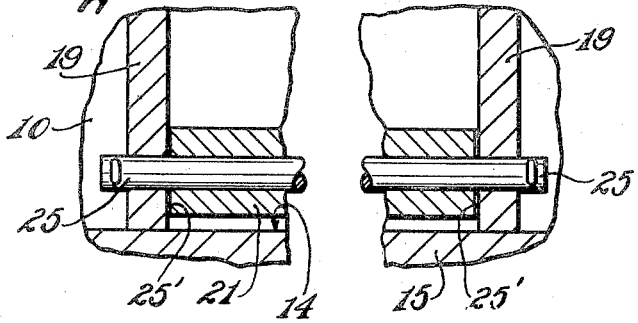
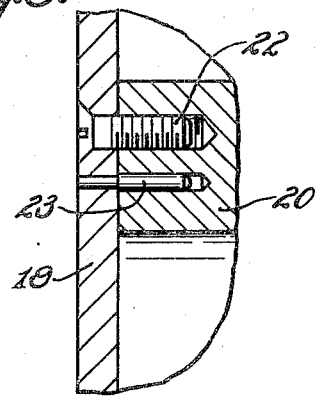
INVENTOR
WARREN H. DE LANCEY
BY
Chapin & Neal
ATTORNEYS Patented Nov. 14, 1944

2,362,541

UNITED STATES PATENT OFFICE 2,362,541

FLUID METER

Warren H. De Lancey, Springfield, Mass., assignor to Gilbert & Barker Manufacturing Company, West Springfield, Mass., a corporation of Massachusetts Application August 11, 1942, Serial No. 454,425

2 Claims. (Cl. 73—260)

This invention relates to an improved rotary meter of the swinging vane type for measuring fluids, such as gases, liquids or semi-solids such as grease.

The invention has for its general objects to provide in a meter of the stated type improvements which substantially reduce friction losses and enable operation on low pressure differentials and which also provide for improved accuracy in operation and low cost of manufacture.

More particularly, the invention has for an object to provide in a meter of the stated type a rotor construction, wherein the swinging vanes are located between, and hinged at their ends to, a pair of circular end plates and cooperate with walls fixed to said plates to form the measuring pockets—the vanes being prevented from swinging outwardly beyond the peripheries of the end plates and from pressing against the cylindrical wall of the chamber in which the rotor is located.

These objects will best be understood as the detailed description proceeds and they will be pointed out in the appended claims.

The invention will be disclosed with reference to the accompanying drawings in which:

Fig. 3 is a cross sectional view thereof taken on the line 3—3 of Fig. 1;

Fig. 4 is a fragmentary sectional view taken similarly to Fig. 1 but showing the rotor in still another position;

Fig. 5 is a fragmentary cross sectional view taken on the line 5—5 of Fig. 3;

Fig. 6 is a fragmentary exterior elevational view showing the means for actuating said crank and sealing devices for such means;

Fig. 7 is a fragmentary sectional view taken on the line 7—7 of Fig. 2;

Fig. 8 is a fragmentary sectional view taken on the line 8—8 of Fig. 1; and

Fig. 9 is a cross sectional view taken on the line 9—9 of Fig. 8.

Figure 1:
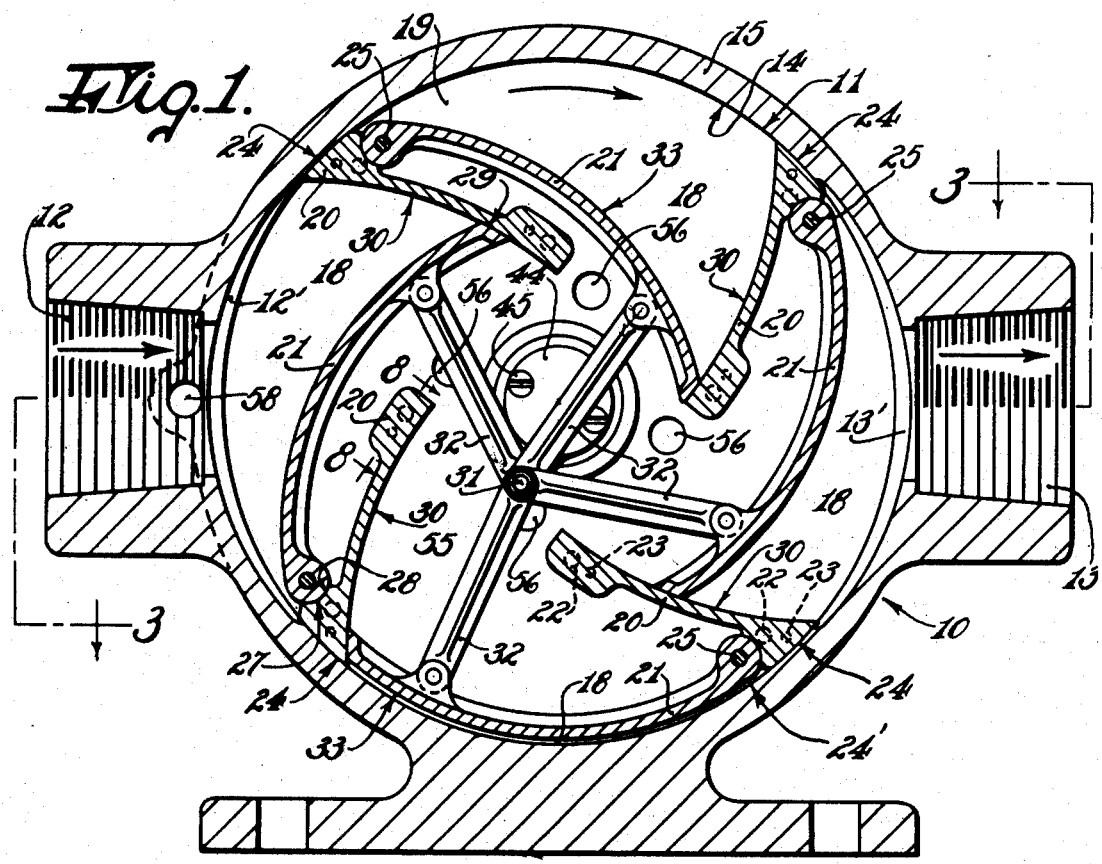
Fig. 1 is a sectional elevational view, taken on the line 1—1 of Fig. 3, of a meter embodying the invention.

Referring to these drawings; the meter includes a stator which comprises a casing 10 having a cylindrical chamber 11 with inlet and outlet passages 12 and 13 communicating with the chamber at circumferentially spaced locations in the inner surface 14 of peripheral wall 15. This chamber is closed at its ends by end walls 16—these walls being flanged as is also the wall 15 and the mating flanges being suitably secured as by cap screws 17.

Within the chamber 11 is a rotor having in its periphery a plurality of circumferentially-spaced measuring pockets 18. This rotor includes two circular end plates 19, each having a running fit with the peripheral wall of the chamber and arranged in axially-spaced relation one near each end thereof. The measuring pockets are formed by a plurality of pairs of walls, the members of each pair being designated 20 and 21. One wall of each pair, as 20, rigidly interconnects the spaced end plates 19 and is suitably secured at its ends thereto, as by the cap screws 22 and dowels 23 (Figs. 1 and 8). Each wall 20 has an outer side edge 24 which is curved and coincides with the curve 24' of the end plates and thus has a running fit with the surface 14 of wall 15. The other wall of each pair as 21, comprises a swinging vane which is suitably hinged, as by a pin 25 to the end plates of the rotor.

Each vane extends between the end plates and its end edges 26 having a sliding fit one with each end plate. As shown in exaggerated form in Fig. 7, a shim washer 25' is placed on pin 25 between each end of the vane and the adjacent plate 19 to insure the desired clearance. This washer is very thin, having for example, a thickness of .002 inch. Each vane 21 likewise extends between adjacent surfaces of two successive walls 20 (Fig. 1) and is carefully fitted to such surfaces. Thus, the hinged end of each vane 21 has a part-cylindrical surface 27 which has a running fit with a complementary curved surface 28 on wall 20. The other end of the vane has a curved surface 29 which has a running fit with a curved surface 30 on a wall 20. The surfaces 27, 28, 29 and 30 of each vane are coaxial with the axis of the hinge pin 25 of such vane.

Within the chamber 11 is a fixed crank pin 31 and links 32 connect the vanes 21 thereto. Hence, as the rotor revolves, the vanes 21 are moved inwardly and outwardly to increase and decrease the volumes of the measuring pockets 18. Each vane is movable from an extreme inner position, such as that shown in Fig. 1 in connection with the uppermost vane, to an extreme outer position, such as that shown in the same figure in connection with the lowermost vane. The vanes are preferably curved as shown at 33 so that the outer surface of each vane, when in its extreme outer position, is coaxial, or substantially so, with that of the inner surface 14 of peripheral wall 15.

It is to be noted that the vanes 21 never touch the surface 14 nor do they move outwardly beyond the peripheries of end plates 19. The arrangement is such that each vane can be carefully fitted to the two surfaces 28 and 30 with which its ends 27 and 29 are respectively relatively movable. This can be done prior to assembly of the rotor in its casing and, since the vanes in normal operation never move away from the surfaces to which they are fitted, the carefully machined fit is preserved. Actually, the pairs of surfaces 27 and 28 and 29 and 30 do not touch. There is a small amount of clearance between them. The same is true of the surfaces 24 and 24' with respect to the surface 14. The rotor can therefore revolve with little frictional resistance and the displacement of the measuring pockets can be made of uniform volume and of a volume that is accurately predetermined and maintained.

The rotor may be rotatably supported within the chamber 11 in any suitable way. As shown in Fig. 3, the two end plates 19 of the rotor are supported by ball bearings 34 from studs 35, fixed in hubs 36, inwardly projecting one from each end wall 16. The end faces of these hubs 35 may also serve to limit the end play of the rotor, as indicated, or any other suitable means may be provided for this purpose.

For the purpose of driving any suitable register, the rotor has fixed thereto a gear 37 which meshes with a gear 38 fixed on a register driving shaft 39—the latter being rotatably mounted in one of the end walls 16 and passing outwardly through the same. Seal rings 40, or any other suitable means, are provided to avoid leakage around shaft 39.

For the purpose of calibrating the measuring pockets 18, means are provided for varying the volume thereof within suitable limits. This may conveniently be done by moving the crank pin 31 radially inward or outward to vary the extent of swinging movement of each vane. As herein shown, this crank pin (Fig. 5) is fixed to a crank 41, the inner portion of which is radially slidable in a groove formed in the end face of a flange 42 formed on an extension 43 (Fig. 3) of one of the above described studs 35. A plate 44, secured to said flange 42, as by screws 45, holds the crank in said groove. The inner part of the crank has a recess 46 in which lies an eccentric 47, which when turned moves the crank and pin 31 radially inward or outward, as desired. The eccentric 47 is fixed to a shaft 48 which extends through extension 43 and its stud 35 out of the casing. A cork gasket 49 (Fig. 9) may be placed on shaft 48 between the eccentric 47 and flange 42 to prevent leakage around shaft 48 or any other suitable means may be provided for this purpose. A hand wheel 50 (Fig. 3), or any other suitable means, may be provided on the outer end of shaft 48 to enable the same to be conveniently turned. As shown, this hand wheel has a circular series of holes 51 (Fig. 6) in any one of which the outer end of a sealing pin 52 may be engaged—the inner end of such pin fitting into a hole in cover 16 (Fig. 3) to prevent rotation of the hand wheel. The outer end of the pin 52 is perforated to receive a sealing wire 53 which may also be passed through one of the unoccupied holes 51 and have its ends joined by a lead seal 54 to guard against unauthorized removal of the pin.

The rotor has a central space 55 (Fig. 1) which is enclosed by the walls 20, 21 of the several measuring pockets 18. This space is connected by one or more openings 56 in end plates 19 to the spaces 57 (Fig. 3) within the covers 16. These spaces 57 are in turn connected by a passage 58 formed in the wall 15 to the inlet passage 12. These openings 56, spaces 57 and passages 58 serve to interconnect the space 55 to the inlet side of the meter and act as a breather passage, much the same as that provided for the crankcase of an internal combustion engine.

The inlet passage 12 includes a terminal port 12' formed as a shallow recess in the peripheral wall 15 of the casing. The purpose of this port is to provide for a relatively long period of communication between each measuring pocket and the inlet. The port 12' is nearly 90° in angular extent and also extends axially as shown in Fig. 3 over the greater part of the length of the cylindrical chamber 11. The arrangement is such that each measuring pocket will communicate with the inlet port 12' during about 160° of each rotation of the rotor, starting with the position shown in connection with the lower measuring pocket in Fig. 2 and ending just a little before that pocket has moved into the position of the upper pocket shown in Fig. 1. The outlet passage has a similar port 13' for the same purpose. Thus, each measuring pocket 18 maintains communication with the outlet port 13' during about 160° of each rotation of the rotor, starting with about the position shown in Fig. 2 in connection with the upper pocket 18 and ending slightly after that pocket has reached the position shown in Fig. 4 in connection with the lowermost pocket. There are two intervals of transition of about 20° each during each rotation of the rotor when a measuring pocket is not filling or discharging.

Figure 2:
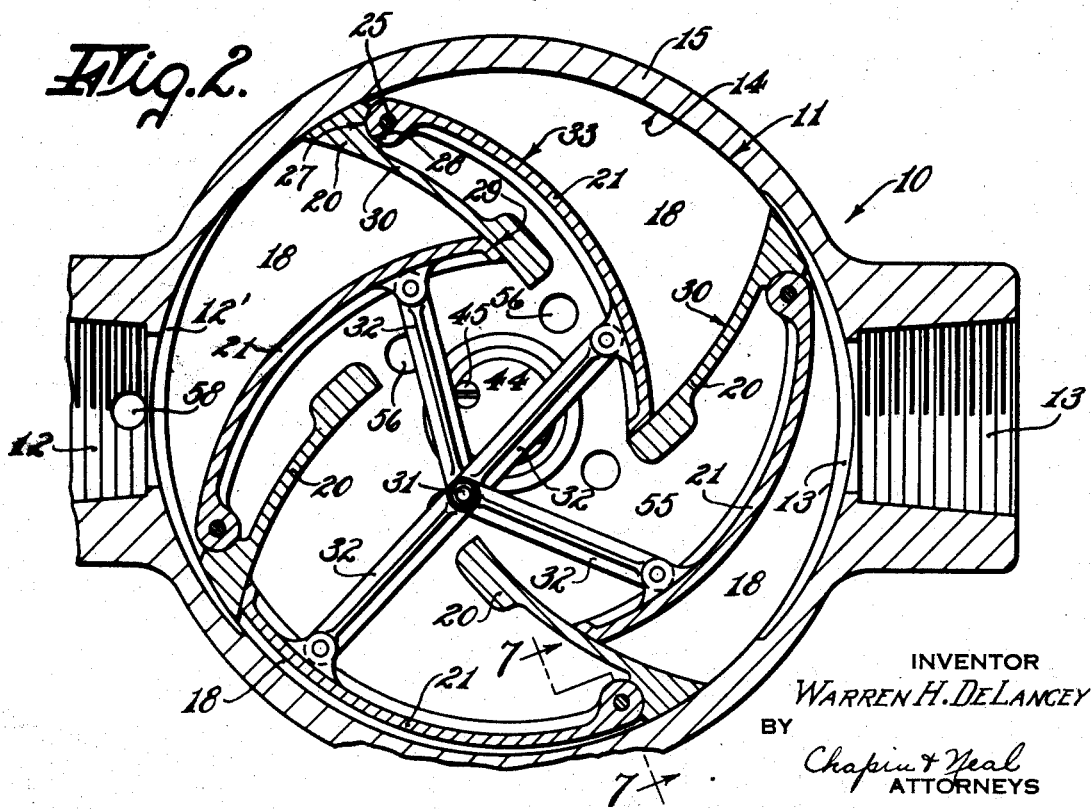
Fig. 2 is a view taken similarly to Fig. 1 but showing the rotor in a different position.

In operation, fluid under pressure entering through inlet 12 and port 12' successively fills the measuring pockets 18 and causes the rotor to revolve in a clockwise direction as viewed in Figs. 1, 2, and 4. As the rotor revolves the pockets successively discharge into the port 13' and outlet 13. The filling intervals of successive pockets overlap for intervals of about 140° so that for the greater part of the time two pockets are being filled at the same time. The same condition applies with respect to the discharge intervals of successive pockets. For example, the filling of each pocket starts when it arrives at the lower position shown in Fig. 2. At the same time the pocket which is immediately ahead of the first-named pocket in the direction of rotation, is also being filled. The filling of both these pockets continues until the leading edge of the forward dividing wall 20 between them reaches the upper edge of port 12'. Then the first-named pocket only is filled during the short interval necessary to bring the next succeeding pocket in the position shown in Fig. 2. The filling of the first-named pocket continues until the leading edge of its rearward wall 20 reaches the upper edge of port 12'. So also, the discharging of each pocket commences when in its upper position at the time when the trailing edge of its forward wall 20 just passes the upper edge of port 13' or substantially as shown in Fig. 2. At this time the pocket which immediately precedes it is also discharging. The discharge of the first-named pocket continues until the leading edge of its rearward wall 20 reaches the lower edge of port 13'. This position is substantially that shown in Fig. 4.

The invention provides an improved meter of the type in which the rotor carries swinging vanes. As distinguished from other meters of this type, the vanes 21 never come in contact with the peripheral wall 14 of the chamber 10 and cannot therefore be pressed against this wall by the pressure of the fluid to create a substantial drag or frictional resistance to movement of the rotor. The several vanes 21 are held by their link connections 32 with the stationary crank pin 31 from moving outwardly beyond the peripheral edges 24' of the plates 19. The vanes 21 can be fitted to the surfaces with which they cooperate before the rotor is assembled in the casing and, once fitted, these cooperating surfaces are maintained without change in the same relationship. This applies to the cooperating surfaces 27 and 28, 29 and 30 and the end edge surfaces of the vanes and the inner surfaces of end plates 19. A predetermined clearance is provided between these surfaces, as above set forth, so that the vanes move very freely with little frictional resistance. The other surfaces 24 and 24' which cooperate with the surface 14 of wall 15 are carefully fitted with a predetermined clearance. The rotor end plates 19 are supported by ball bearings to still further reduce the frictional load. The result is that the rotor and its vanes move very freely so that very little power is required to operate it, wherefore the meter will operate on a very small differential of pressure. It is intended and preferred to have the meter located so that its axis of revolution lies horizontally. This arrangement avoids the end thrust on one or the other of the plates 19 that would occur with any other arrangement due to the weight of the vanes bearing against an end plate and it avoids the friction that would be incident to such end thrust.

The meter of this invention not only provides an easy-running meter of the type in which the rotor carries swinging vanes but it also provides a simple construction in which the measuring pockets may be accurately formed to contain a predetermined volume and maintained without variation at such volume. Each measuring pocket 18 is formed wholly in the rotor between relatively fixed and movable walls 20 and 21, respectively. The movable walls or vanes 21 by their careful fitting to the cooperating walls 20 insure the described result.

The meter is further characterized in that the rotor chamber is wholly cylindrical and can be easily and inexpensively machined. The rotor presents two cylindrical surfaces 24' and part cylindrical surfaces 24 which can be easily and cheaply machined. The pocket walls 20 and 21 have surfaces which have to be machined but these are all part-cylindrical or plane surfaces and the work may be done accurately and at low cost in quantity production.

Thus, I have provided a rotary meter of the swinging vane type, characterized by improved accuracy and reduced frictional resistance and simplicity of construction.

I claim:

1. A meter, comprising, a casing having peripheral and end walls defining a cylindrical chamber with an inlet and an outlet passage communicating with said chamber at angularly-spaced locations in the peripheral wall thereof, and a rotor having a plurality of measuring pockets in its periphery and mounted in said chamber to be rotated by the passage of fluid from the inlet to the outlet; said rotor consisting of two circular end plates located one near each end of said chamber in axially-spaced relation and each having a running fit between its peripheral edge and the inner surface of said peripheral wall, each said pocket being formed between relatively fixed and movable walls extending between said plates, each movable wall being hinged at one end to the end plates close to the peripheries thereof and having its other end slidably engaged with one of the relatively fixed walls; members extending inwardly one from each end wall to rotatably support the end plates and one thereof passing through an end plate into the space encompassed by the several measuring pockets, a crank located in said space and mounted on the last-named member for radial movements of adjustment, an eccentric for moving said crank, a shaft carrying the eccentric and extending through the last-named member and the end wall to which it is fixed, a crank pin on said crank, a rigid link connecting each movable wall to said crank pin and preventing each movable wall from moving outwardly beyond the peripheral edges of said plates, and a shaft mounted in said casing and connected to the rotor to be turned thereby.

2. A meter comprising, a casing having peripheral and end walls defining a cylindrical chamber with an inlet and an outlet passage communicating with said chamber at angularly-spaced locations in the periphral wall thereof, and a rotor having a plurality of measuring pockets in its periphery and mounted in said chamber to be rotated by the passage of fluid from the inlet to the outlet; said rotor consisting of two circular end plates located one near each end of said chamber in axially-spaced relation and each having a running fit between its peripheral edge and the inner surface of said peripheral wall, each said pocket being formed between relatively fixed and movable walls extending between said plates, each movable wall being hinged at one end to the end plates close to the peripheries thereof and having its other end slidably engaged with one of the relatively fixed walls, a crank pin fixed eccentrically in said chamber, a rigid link connecting each movable wall to said crank pin and preventing such wall from moving outwardly beyond the peripheral edges of said plates, and a shaft mounted in said casing and connected to the rotor to be turned thereby, at least one of said end plates having a breather opening therethrough leading into the central space enclosed between the two end plates and all the walls of the measuring pockets, said casing having a continuously open passage connecting each such opening to said inlet passage.

WARREN H. DE LANCEY.